United States Patent [19]

Ishikawa

[11] Patent Number: 5,050,891
[45] Date of Patent: Sep. 24, 1991

[54] SEALING MEMBER FOR FERROFLUID SEAL

[75] Inventor: Ryuhei Ishikawa, Tokyo, Japan

[73] Assignee: Nippon Ferrofluidice Corporation, Tokyo, Japan

[21] Appl. No.: 444,165

[22] PCT Filed: Mar. 31, 1989

[86] PCT No.: PCT/JP89/00343

§ 371 Date: Nov. 29, 1989

§ 102(e) Date: Nov. 29, 1989

[87] PCT Pub. No.: WO89/09356

PCT Pub. Date: Oct. 5, 1989

[30] Foreign Application Priority Data

Mar. 31, 1988 [JP] Japan .................. 63-80607

[51] Int. Cl.⁵ .................................. F16J 15/54
[52] U.S. Cl. ............................ 277/80; 277/135
[58] Field of Search .................. 277/80, 135

[56] References Cited

U.S. PATENT DOCUMENTS 4,357,022 11/1982 Raj ............................... 277/80
4,592,557 6/1986 Iversen ......................... 277/135

FOREIGN PATENT DOCUMENTS 63152773 12/1986 Japan .
0694710 10/1979 U.S.S.R. ..................... 277/80
0889988 12/1981 U.S.S.R. ..................... 277/80
1292338 11/1972 United Kingdom ............ 277/80

*Primary Examiner*—William A. Cuchlinski, Jr.
*Assistant Examiner*—Daniel G. DePumpo
*Attorney, Agent, or Firm*—Armstrong, Nikaido, Marmelstein, Kubovcik & Murray

[57] ABSTRACT

A sealing member for a ferrofluid seal according to the present invention is a sealing member (1) arranged so as to surround a periphery of a working member (5) such as a shaft. The sealing member (1) comprises an annular magnet (2) and an annular pole piece (3), an electrically conductive ferrofluid (6) being provided between the sealing member (1) and the working member (5) to construct an electrically conductive magnetic fluid-sealing member. An inner circumferential surface of the annular magnet (2) is coated with an electrically conductive non-magnetic film (4) continuing to the annular pole piece (3) to reduce size of the sealing member (1) and reduce electrical resistance.

2 Claims, 1 Drawing Sheet

SEALING MEMBER FOR FERROFLUID SEAL

TECHNICAL FIELD

This invention relates to a sealing member for a ferrofluid seal, more particularly to a sealing member comprising an annular magnet and annular pole pieces which can form an electrically conductive ferrofluid seal by interposing an electrically conductive ferrofluid between the sealing member and a working member.

TECHNICAL BACKGROUND

Sealing devices utilizing ferrofluid are known as described, for example, in Japanese Patent Publication No. 24585/1986. Such a sealing device has an annular sealing member to be disposed so as to surround the circumference of a shaft. This sealing member comprises an annular magnet and a pair of pole pieces bonded onto both sides of the annular magnet, with a ferrofluid being interposed between the internal circumferential surfaces of the annular pole pieces and the external circumferential surface of the shaft, whereby to function as a sealer.

In recent years, it has been attempted in such a sealing device to form an electric circuit utilizing an electrically conductive ferrofluid as the ferrofluid, in which electric current flows from the annular pole pieces through the ferrofluid to the shaft, which is, for example, utilized as a grounding circuit for preventing computer hard disks from being charged with static electricity.

When it is desired that such ferrofluid be used as a part of an electric circuit, said part must have the smallest possible resistance. The resistance value in said part depends on the conducting area and the distance current flows in the ferro-fluid. The latter conducting distance corresponds to the distance between the internal circumferential surface of the annular pole pieces and the external circumferential surface of the shaft, namely to the seal gap, and it is extremely difficult to further reduce the seal gap in view of its relationship with assembling accuracy and the like. On the other hand, the former conducting area is predominantly defined by the area of the internal circumferential surface of the annular pole pieces. Accordingly, in order to increase the conducting area, the thickness of the annular pole pieces must be increased, and thus more compact sealing devices which are in demand cannot be obtained.

This invention has been accomplished for solving the above problems of the prior art and is directed to provide a sealing member for a ferrofluid seal which can reduce the electrical resistance at the section of ferrofluid and form a compact sealing device.

These and other objects of this invention will become more apparent from the description of the following embodiment.

DISCLOSURE OF THE INVENTION

The sealing member for a ferrofluid seal according to this invention is to be disposed to surround the circumference of a working member such as a shaft, consisting of an annular magnet and annular pole pieces, which forms an electrically conductive ferrofluid seal by interposing an electrically conductive ferrofluid between the sealing member and the working member, wherein the annular magnet has an electrically conductive nonmagnetic coating on the internal circumferential surface and said coating extends over the above annular pole pieces.

In this invention, the sealing member has the nonmagnetic coating over the entire surface.

The sealing member for ferrofluid seal functions as follows: Namely, both the internal circumferential surface of the annular magnet or the electrically conductive coating and the internal circumferential surfaces of the annular pole pieces function as an electrode against the ferrofluid, whereby sufficient conducting area can be secured, and electrical resistance can be reduced without increasing the size of the sealing member as conventionally practiced. In this constitution, since the conductive coating is made of a nonmagnetic material, the affect which may be caused by the presence of this coating on the magneticity retaining mechanism of the ferrofluid will be negligible.

MOST PREFERRED EMBODIMENT OF THE INVENTION

Next, typical embodiments of the sealing member for the ferro-fluid seal of this invention will be described in detail referring to the attached drawings.

Figure 1:
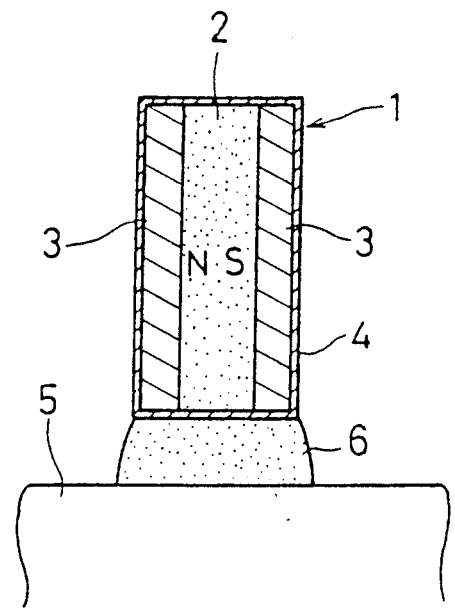
FIG. 1 illustrates an embodiment of the sealing member for a ferrofluid seal according to this invention.

In FIG. 1 illustrating the upper half of the sealing member in vertical cross section, the reference numeral 1 shows a sealing member, which is fabricated by bonding a pair of annular pole pieces 3,3 on both sides of an annular magnet 2. The annular magnet 2 and the annular pole pieces 3,3 are made of a rubbery magnet and the like (such as one obtained by incorporating a magnetic powder such as ferrite into a rubber) and a magnetic material such as stainless steel, respectively, and both members are bonded together using a synthetic rubber adhesive. The sealing member 1 has an electrically conductive nonmagnetic coating 4 over the entire surface. The coating 4 can be formed by applying a chrome plating, gold plating or electrolytic or nonelectrolytic nickel plating to the sealing member 1. Incidentally, in FIG. 1, the reference numerals 5 and 6 show a working member shaft and a ferrofluid, respectively. The above annular magnet and the annular pole pieces 3,3 each are of continuous shape and have uniform cross sections over the entire circumferences. The coating 4 is formed continuously to enclose the annular magnet and the annular pole pieces 3,3 to have uniform cross sections over the entire circumference thereof. Accordingly, the ferrofluid 6 also dwells between the sealing member 1 and the shaft 5 continuously and uniformly over the entire circumference.

In the above sealing member 1, since the entire internal circumferential surface thereof functions as an electrode surface against the ferrofluid 6, electrical resistance can be reduced using the same thickness of sealing member 1 as used in conventional sealing members. In this embodiment, since the coating 4 is of a nonmagnetic material, the affect which may be caused by the presence of the coating 4 on the mechanism of retaining the ferro-fluid will be negligible.

In the prior art, an anti-dusting coating is applied on the annular magnet 2 made of, for example, a rubbery magnet to prevent dusting from the magnet in use. However, if the sealing member 1 is entirely coated as described above, such treatment of the magnet 2 with the anti-dusting coating can advantageously be omitted. When the sealing member has the coating over the entire surface, intrusion of ferrofluid 6 into the gaps between the annular magnet 2 and the annular pole pieces 3,3 which are liable to be formed due to the insufficient adhesion can be prevented, whereby the inconvenience of reduction in the level of the fluid to be retained can also be prevented.

Figure 2:
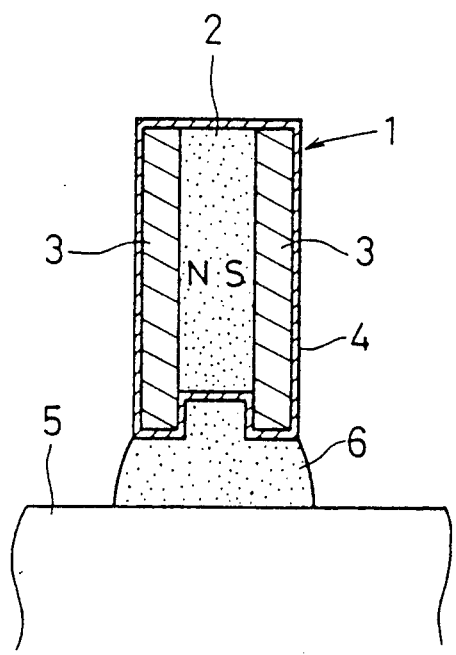
FIG. 2 illustrates a variation of such sealing member.

While FIG. 1 illustrates an embodiment in which the annular magnet 2 and the annular pole pieces 3,3 all have substantially equal inner diameters, this invention can also be practiced almost analogously in a constitution shown in FIG. 2 in which an annular magnet 2 has an inner diameter greater than that of the annular pole pieces 3,3 or in a constitution not shown, in which the annular magnet 2 has an annular pole piece 3 bonded only on one side. FIG. 2 also shows the upper half of the sealing member 1 in cross section. The coating 4 to be applied on the sealing 1 can also be obtained using a method other than plating, such as coating and vapor deposition. Further, such coating to be applied may not be present over the entire surface of the sealing member 1 but on a predetermined portion, and such localized coating may be a silver paste applied only to the internal circumferential surface of the sealing member 1.

EFFECT OF THE INVENTION

Since both the internal circumferential surface of the annular magnet or the electrically conductive coating and those of the annular pole pieces function as an electrode against the ferrofluid, sufficient conducting area can be secured and electrical resistance can be reduced without increasing the size of the sealing member as practiced in the prior art.

INDUSTRIAL UTILITY

As has been described above, the sealing member for ferrofluid seal according to this invention can be used as a member for sealing a working member such as a shaft, particularly suitably in an application for forming an electric circuit between the sealing member and the shaft to be used as a grounding circuit for preventing computer hard discs from being charged with static electricity.

I claim:

1. A sealing member for a ferrofluid seal to be disposed so as to surround an external circumference of a working member such as a shaft, said sealing member comprising:
   an annular magnet and annular pole pieces arranged at each side thereof and forming an electrically conductive ferrofluid seal by interposing an electrically conductive ferrofluid between the sealing member and the working member; and
   an electrically conductive nonmagnetic coating on internal circumferential surfaces of said magnet and pole pieces, wherein said coating extends over said annular pole pieces.

2. A sealing member for a ferrofluid seal according to claim 1, wherein the nonmagnetic coating extends over all external surfaces of the sealing member.

* * * * *

UNITED STATES PATENT AND TRADEMARK OFFICE
CERTIFICATE OF CORRECTION

PATENT NO. : 5,050,891

DATED : September 24, 1991

INVENTOR(S) : Ryuhei ISHIKAWA

It is certified that error appears in the above-identified patent and that said Letters Patent is hereby corrected as shown below:

On the title page, Item [73], first line, "Ferrofluidice" should read -- Ferrofluidics --.

Signed and Sealed this

Second Day of February, 1993

Attest:

STEPHEN G. KUNIN

Attesting Officer

Acting Commissioner of Patents and Trademarks